May 18, 1965     K. R. KELLEY ETAL     3,183,636
SHAFT GRINDING AND RESURFACING
Filed March 30, 1964     6 Sheets-Sheet 2

INVENTORS.
KENDAL R. KELLEY
REGINALD MILHEISER
BY
ATTORNEYS

May 18, 1965 K. R. KELLEY ETAL 3,183,636
SHAFT GRINDING AND RESURFACING
Filed March 30, 1964 6 Sheets-Sheet 5

INVENTORS.
KENDAL R. KELLEY
REGINALD MILHEISER
BY Ernest J Wemberger
Max H Farmer
ATTORNEYS United States Patent Office 3,183,636
Patented May 18, 1965

3,183,636
SHAFT GRINDING AND RESURFACING
Kendal R. Kelley, 220 W. 107th St., New York, N.Y., and Reginald Milheiser, 34—21 62nd St., Woodside, N.Y.
Filed Mar. 30, 1964, Ser. No. 355,978
4 Claims. (Cl. 51—241)
(Granted under Title 35, U.S. Code (1952), sec. 266)

The invention described herein may be manufactured and used by or for the Government of the United States of America for governmental purposes without the payment of any royalties thereon or therefor.

This invention is a continuation in part of our application filed June 15, 1960, Serial No. 36,455, now Patent Number 3,141,364, granted on July 21, 1964, entitled Resurfacing Machine for Propeller Shafts, and relates in general to resurfacing machines for circular or cylindrical machining, and more particularly to resurfacing and machining of shafts without removal of the shaft from its operative position.

In the past, resurfacing of shafts has necessitated the removal of the shaft to a shop equipped for carrying out this operation particularly where large diameter shafts are involved. This is particularly true where precision griding is desired since in-place operations have always been subject to vibration, eccentricity of the turned shaft, space problems, poor mounting facilities, large machines and danger to operating personnel. This problem has existed for many years and various solutions have been suggested and tried without satisfactory results. This long-standing problem has recently become more acute in many fields, as for example, aboard ships where higher speeds have become possible with more efficient engines and power plants. The result of these improvements has caused main propeller shafts to become worn and disable vessels having only one shaft such as submarines, or reduce the speed of vessels equipped with multiple shafts. Under either condition, the ship must be drydocked and the shaft repaired as soon as possible, thereby deactivating the ship for a considerable length of time.

One frequent and common repair of the shaft will illustrate the procedure and problems which are encountered and solved by this invention. The main ship propeller shaft, which couples the drive mechanism to the propeller passes through the stern hull section of the ship and therefore requires a water-tight bearing at this or a proximate location. Generally, this stern tube bearing is located well within the confines of the ship since that portion of the shaft and its appurtenant bearings are lubricated by sea water. This inner stern tube bearing consists in part of a stuffing tube box which encloses and confines a packing material between the inner surface of the box and a metallic sleeve or journal which abuts the outer surface of the propeller shaft although allowing free rotation of the shaft. Due in part to normal wear and the fact that foreign matter entering via sea water becomes deposited and embedded within the packing material, the sleeve becomes damaged and scored so that either the system develops a leak or the packing material binds the shaft through the sleeve. When this condition arises, the sleeve must be resurfaced and the packing replaced. Our prior application has covered apparatus which obviates this problem. The present procedure generally followed, consists of removing that portion of the propeller shaft carrying the sleeve while the ship is in drydock, resurfacing the sleeve and then reassembling the propeller shaft. This procedure at first impression may appear to be quite simple, but this is not the case when one considers that for most ships the diameter of the shaft exceeds one foot and the propeller and its auxiliaries must also be removed. The remaining portions of the shaft must be independently supported, the shaft which is located in the lowermost section of the ship must be removed with the use of cranes. At best, the entire operation is costly and time consuming, as for example, for ships having an 18 inch shaft, the cost of resurfacing may exceed $12,000, and the time required may be as high as 10 working days in addition to the expense of drydocking.

An object of this invention is to provide an apparatus for resurfacing or grinding in place, shafts and the like.

Another object is to provide a simple, efficient, inexpensive and accurate device for resurfacing or grinding shafts without removing the shafts from their operative position.

A further object is to provide a method for precision resurfacing or grinding of shafts while in their operative position.

A still further object is to provide a simple, practical, inexpensive method for precision resurfacing of shafts aboard ships while the shaft is in operative position without drydocking the ship.

Still another object of this invention is to provide a simple, practical, inexpensive device for precision resurfacing of shafts and shaft sleeves aboard a ship without removing the shaft or sleeve from its operative position and without the necessity of drydocking the ship.

Other objects and advantages will be apparent from the following description of an embodiment of the invention and the novel features thereof will be particularly pointed out hereinafter in connection with the appended claims.

Figure 1:
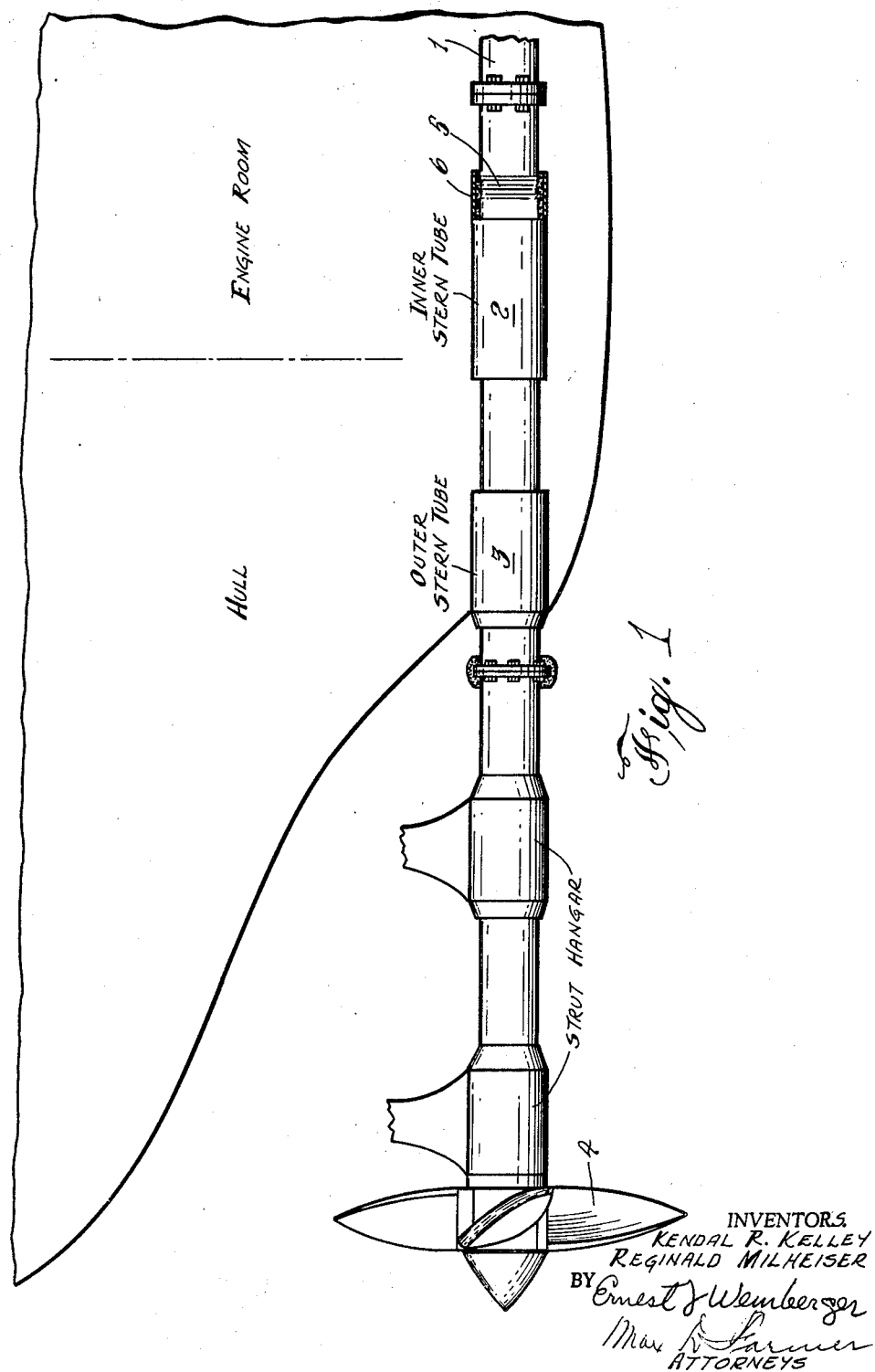
FIG. 1 is a front elevation of the stern portion of the main ship propeller shaft.

The embodiment made in accordance with this invention illustrated herein has been shown as mounted on a ship's main propeller shaft whose journal or sleeve is to be resurfaced. The sleeve or journal serves to prevent sea water from entering the ship and a typical arrangement of the stern shaft section is shown in FIG. 1. The propeller shaft 1 extends from the ship's reduction assembly (not shown) via several couplings to the inner stern tube 2, then through the outer stren tube 3 to the propeller 4. Both the inner and outer stern tubes contain bearings which are lubricated by sea water. Mounted concentric with the sleeve or journal 5 is a stuffing tube or box 6 which is attached to the forward end of the inner stern tube. Packing material (not shown) is disposed between the journal 5 and the inner surface of the stuffing box, thereby maintaining the water-tight integrity of the system. The journal is usually made of brass, bronze or similar suitable metal and is sweated on over the propeller shaft. The journal after a period of time becomes scored by the abrasive action of the packing material and by the sand and grit deposited thereon by the salt water within the inner stern tube and the sleeve must be resurfaced in order to maintain a water-tight seal. During this operation the packing is also replaced. In order to resurface the journal by prior methods, the section of the shaft carrying the journal had to be removed and machining accomplished at another location such as a machine shop. Removal of the shaft aft of the coupling is required and this therefore includes disassembly and removal of the propeller, palms, strut and hanger which operation is both expensive, time consuming and difficult where large shafts are involved.

Figure 2:
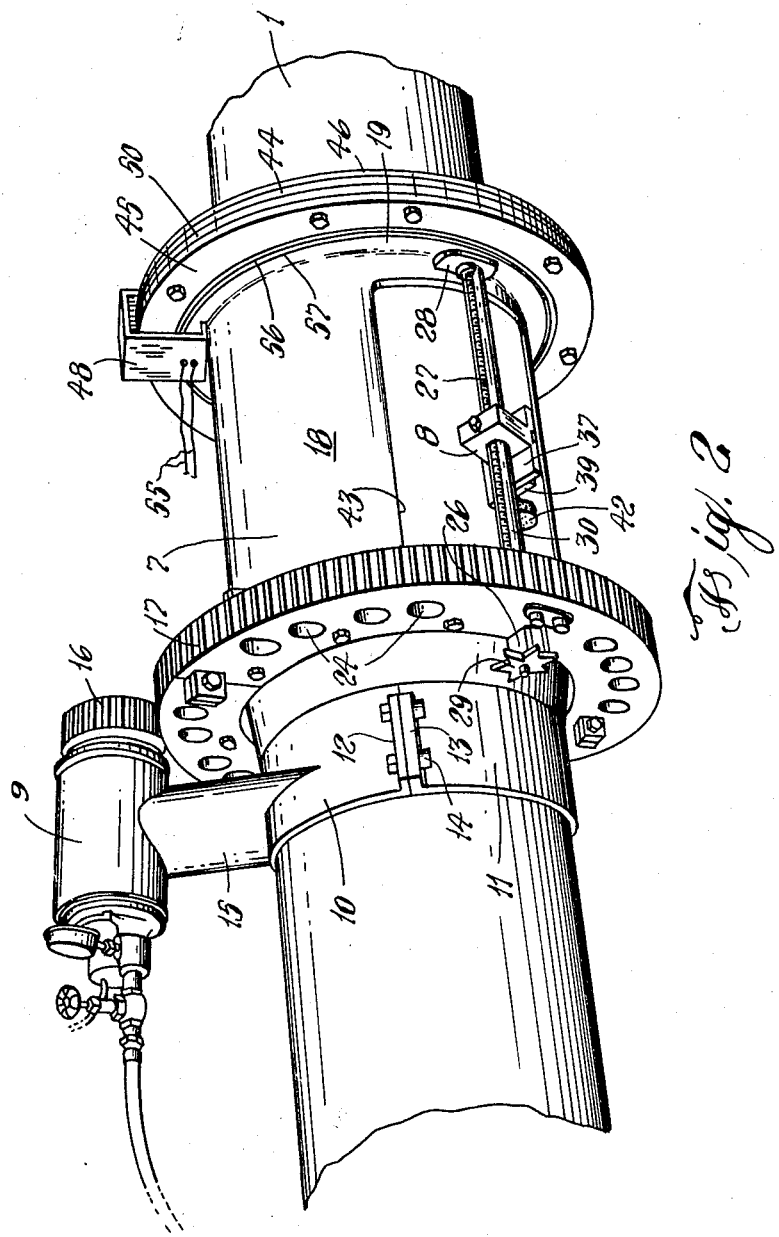
FIG. 2 is a perspective drawing illustrating the embodiment made in accordance with this invention mounted on a shaft over the sleeve to be machined.
Figure 3:
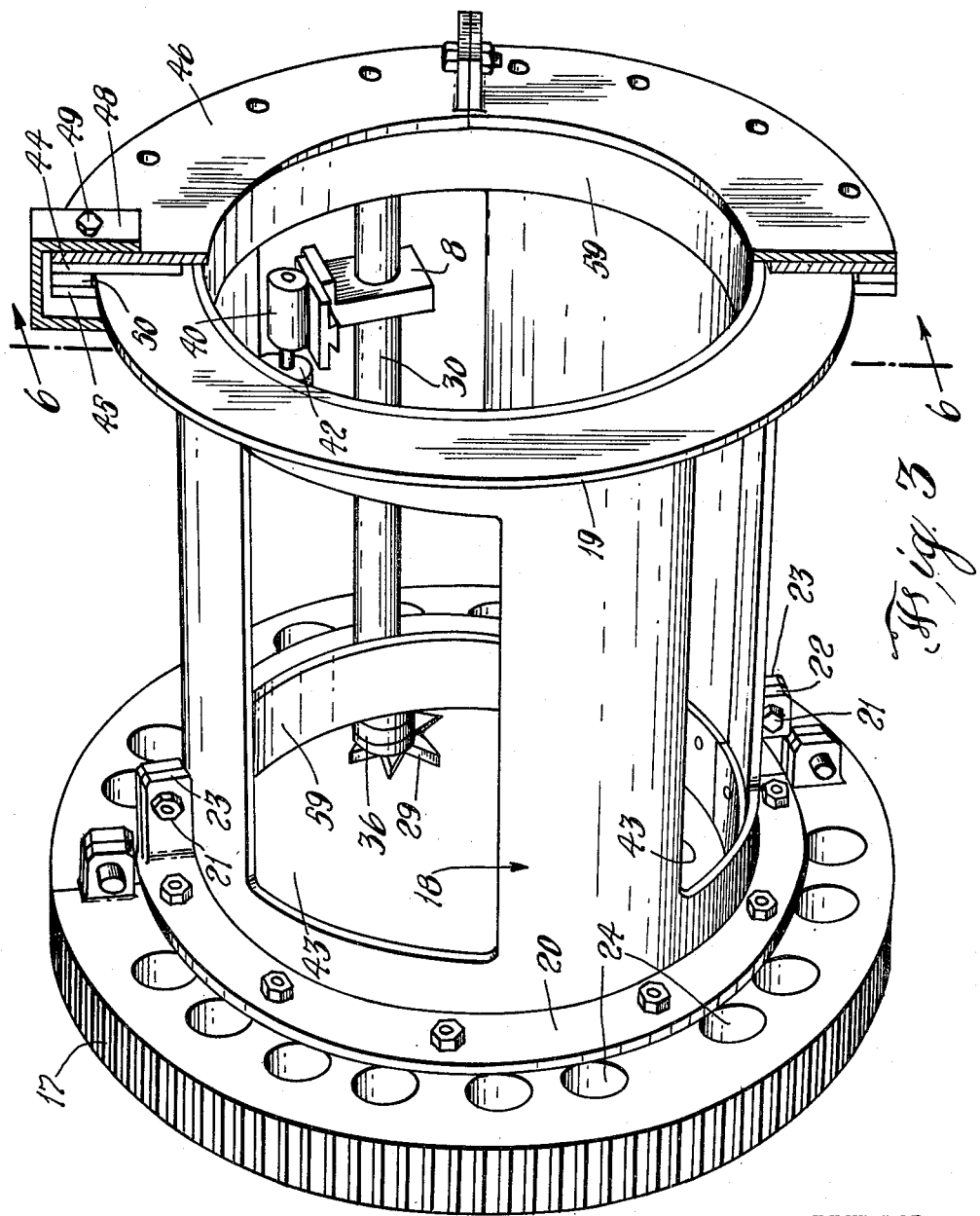
FIG. 3 is a perspective drawing illustrating a partly disassembled portion of the embodiment of FIG. 2.
Figure 4:
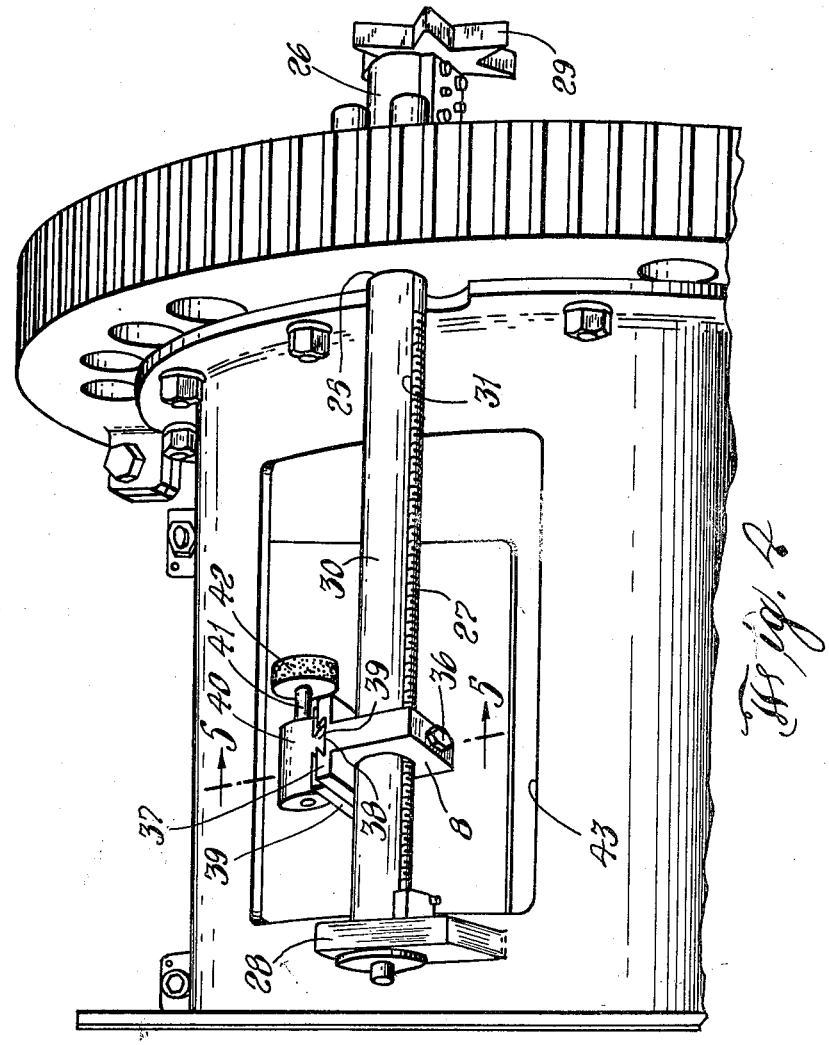
FIG. 4 is a perspective drawing of a portion of the embodiment of FIG. 2.

In the embodiment of the invention illustrated in FIGS. 2 through 4, the resurfacing machine comprises an encircling assembly 7 which carries a holder 8 and is mounted on the shaft 1 for rotation about the surface to be machined.

A motor 9 for driving the encircling assembly is mounted and supported adjacent the encircling assembly by a pair of right semicircular metallic cylinders 10 and 11 whose inner surfaces tightly abut and confine the cylinders on the shaft against movement thereon.

Although the preceding description deals with the resurfacing of a brass component which, as described in our previous application, can be accomplished by cutting, a more severe problem is encountered when the surface to be machined is of a metal harder than brass. Such is the case for other portions of a ship's shaft where hardened steel would be resurfaced. Under these conditions it is impossible to cut and therefore another form of resurfacing must be employed. With this in mind, we will proceed to an explanation of an embodiment made in accordance with the principle of the instant invention.

These encricling complementary cylinders are each provided with a pair of lateral coupling flanges 12 and 13 that may be joined together by bolts 14 passing through aligned holes in the flanges, whereby the cylinders may be individually placed on the shaft and then coupled together. One of the cylinders 10 carries a radial outwardly extending support 15 which is secured to that cylinder section by welding or other suitable means such as rivets. Mounted securely on the free end of the extending support is an air motor 9 or any other suitable driving device, as for example, an electric motor, although an air motor is preferable where accurate speed control is necessary. The motor is provided with a circular gear 16 whose axis of rotation is parallel to and spaced from the shaft, which is driven by the motor and meshed or coupled to a bull gear 17 which forms a part of the encircling assembly 7.

Figure 5:
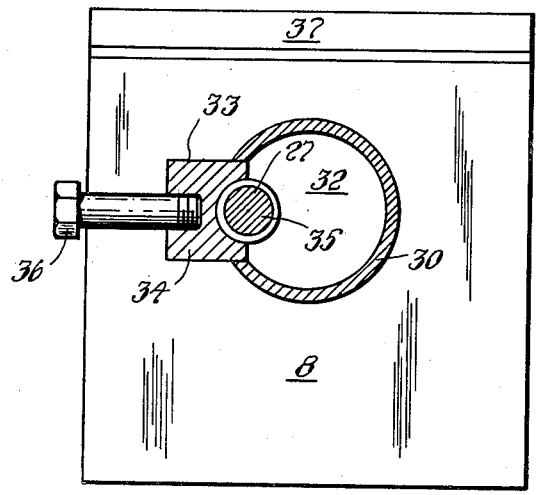
FIG. 5 is a cross-sectional plan approximately along 5'—5' of FIG. 4.

The encircling assembly which is also illustrated in FIG. 3 comprises a main member which is made up of two elongated hemispheric cylinders that may be joined together to form a right circular cylinder. Each cylinder of the main member has a pair of outwardly extending flanges 19, at one end, which serves as a thrust bearing and 20 at the other end which is affixed to the circular bull gear 17 by bolts. The gear teeth of the bull gear are located along its outer radial peripheral edge. The two cylinder portions are joined together by bolts 21 which pass through abutting flange extensions 22 and 23 to form the main assembly. Apertures 24 are provided through the flange portion of the bull gear in a direction along the shaft axis so as to reduce the weight of the machine. The flange of the bull gear 17 is provided with an opening 25 as illustrated in FIG. 4 and an internal bearing (not shown) within housing 26 through which feed screw 27 passes. Aligned with the aperture 25 and attached to the cylinder 18 near but spaced from the thrust bearing 19 is a lock plate 28 also provided with an internal bearing, so that the feed screw may be rotated by a star wheel 29 disposed at the other end of the feed screw. Surrounding the screw 27 along its length is a cylindrical boring bar assembly cover 30 which is affixed to the lock plate at one end and attached to the bull gear flange at the other end where it passes therethrough. The assembly boring bar cover is provided with a longitudinally extending slot 31 so that the support base holder 8 may contact the feed screw and ride along the assembly cover in a direction lengthwise of the shaft while being support thereon. The holder 8 illustrated in FIG. 5 is provided with a lengthwise passage 32 which is, for the most part, circular in cross-section, and thereby may slidingly abut the outer surface of the boring bar cover 30. That portion of the passage 32 which faces the longitudinal slot 31 of the boring bar cover is provided with a recess 33 or lengthwise slot having at least two abutments and a feed-screw nut 34 whose outer walls abut the recess walls and is disposed within the recess so that the nut may not turn or rotate with rotation of the feed-screw. The simi-circular recess 35 lengthwise of the nut is internally threaded to mate with the feed-screw 27. The feed nut is held in place and against the feed-screw by a set or retaining screw 36 which passes radially through the holder and bears against an outer face of the feed nut which may be countersunk to accept the screw. This serves to hold the holder and nut in their operating relation. When the screw 36 is loosened, the holder may be slid lengthwise and disengaged from the nut and rotated independently. In operating position, as the feed-screw is turned by the star wheel, the tool holder will progress toward or away from the star wheel depending on the direction of rotation. Since the holder cannot rotate and the feed nut is held in position, although the above method has been found satisfactory, it should be noted that many standard techniques are available for progressively moving the holder in a lengthwise direction.

The holder is provided with an upper portion 37 having a transverse channel 38 (shown in FIG. 4) within which a mating slidable base 39 is confined. Disposed on and affixed to the base is a motor 40 whose shaft 41 carries a grinding abrasive wheel 42. The base 39 is movable toward and away from the shaft to be resurfaced and may be fixed in any selected position. The size and dimensions of the holder and the position of the boring bar assembly are such that the grinder may be adjusted to contact the surface to be ground and adjusted for any required depth of grinding. The encircling cylinders 18 of the encircling assembly, as per FIG. 3, have a lengthwise cut-out 43 extending almost from the base of the bull gear to the thrust bearing 19. This cut out allows the wheel 42 to contact the surface to be machined along a length sufficient to machine a useable portion of the shaft and of a sufficient height to permit visual observation of the surface.

The thrust bearing 19, as illustarted in FIGS. 2 and 3, is integral with the encircling assembly (cylinders) and extends radially therefrom. It is disposed between a back plate 44 and a keeper ring assembly 45 so as to permit the encircling assembly to rotate and also provide a thrust for bearing for the bull gear and the assembly. Disposed in abutting relation to the back plate 44 is shaft clamp member 46 which is a split clamp assembly having flanges 47 joined and bolted together and thereby firmly affixed to the stationary shaft.

Figure 6:
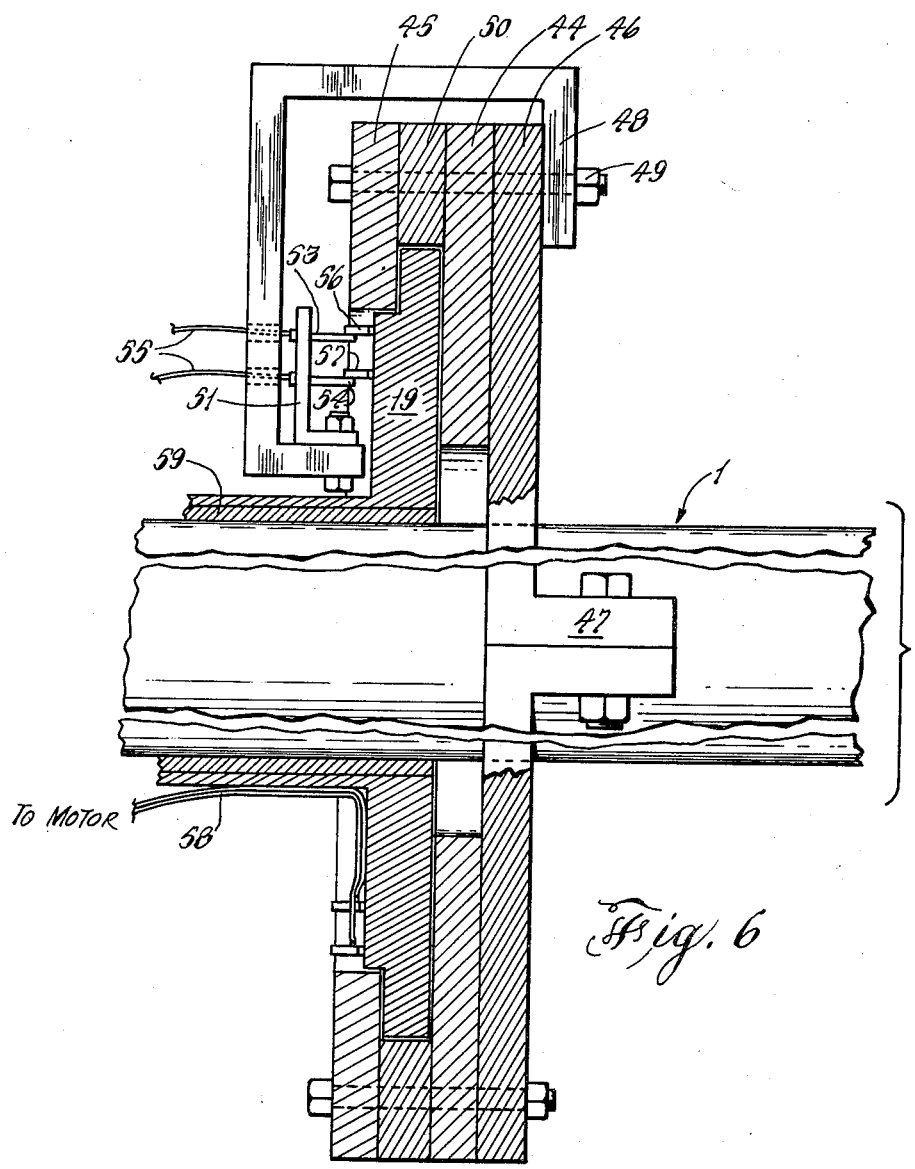
FIG. 6 is a sectional view taken approximately along 6—6 of FIG. 3.

The brush assembly bracket 48 as best illustrated in FIG. 6 is affixed by way of bolt 49 to the clamp as are the back plate 44, keeper ring 45, spacer 50 to thereby form a thrust assembly for bearing 19. The lower portion of the brush assembly carries an L-shaped bracket 51 bolted thereto which in turn supports from its upstanding arm 52 a pair of laterally extending electrical brushes 53 and 54. Power leads 55 are connected to the brushes and electrically insulated from the L bracket 51 and from the brush assembly bracket 48. Complementing thereto are a pair of concentric rings 56 and 57 carried by and insulated from the thrust bearing flange 19. Connected to these rings 56 and 57 are a pair of wires 58 which are employed to supply electrical energy to the grinder motor. These wires may extend inwardly along the thrust bearing flange 19 thence along the encircling member and finally to the motor. In operation the brush bracket remains stationary while the thrust flange rotates with the encircling member as does the motor so that there is no relative movement or motion between the wires 58, the motor and the flange. It should be observed that although the abrasive grinder element is rotated by the motor, if it were merely free to rotate without independent motive rotation, it would nevertheless accomplish a grinding operation since by physically contacting the shaft it would be rotated by the relative movement of the encircling members about the shaft.

Leg portion 50 serves as a spacer between the longer arm 44 and the keeper ring 45 and since the width of the spacer portion 50 is approximately equal to the thickness of the flange 19 which rides and rotates therebetween, it is in effect a structural thrust bearing assembly. The radius of the thrust flange 19 is just slightly smaller than the radial length measured from the center of the shaft to the inner peripheral wall of the spacer portion 50 of the back plate so that the thrust flange and the encircling assembly are thereby partially supported about the shaft. The keeper ring and the back plate are each fabricated in sections, as for example, two semicircular rings whereby they may be placed around the shaft and bolted in position to the clamp assembly.

With the entire rotating assembly thus supported, only by the clamp assembly, it is possible to rotate the assembly about the shaft and grind the shaft which is disposed under or within the encircling assembly. This rotational arrangement, however, would not result in the machining precision necessary and would possibly be somewhat eccentric. Semicircular filler rings 59 are fastened to the inside surface of the end portions of the encircling assembly by countersunk screws. They are disposed at the end portions of the assembly near the flange and bull gear and are of a width so as to approximately underlay that portion of the encircling assembly over which the cut-out 43 does not extend. The filler rings ride on that portion of the shaft that is not to be machined (not damaged) and are to serve as bearing supports for the rotation of the encircling assembly. The thickness of the filler rings is selected so that the rings (i.e., diameter of the ring) or their inner surfaces properly abut the outer surface of the shaft and thereby insures a smooth running fit. The thickness of these rings is also selected so that the method and the device of this invention may be employed on different sized shafts. The filler rings are provided with an extremely smooth inner surface in order to permit ease of rotation and high efficiency and precision. Substitution of roller bearings for the filler rings will increase the precision of machining from 1 or 2 mils to far less than a fraction of 1 mil.

Although the method and apparatus of the invention may be employed for various in-place grinding, the following explanation relative to the main propeller shaft of a ship will serve as a satisfactory illustration. FIG. 1 indicates the relative relationship and positions of the various components making up the stern section of the propeller drive coupling. The inner and outer stern tubes are lubricated by sea water and in order to prevent this water from entering the ship, a stuffing box 6 is employed at the end of the inner stern tube. The stuffing box consists in part of an outer tube, a bronze sleeve 5 which has been, as is common, sweated on to the shaft 1. The sleeve is concentrically aligned with the outer tube with packing material between the tube and sleeve, thereby forming a watertight bearing. As is generally the case after some use, the central portion of the sleeve becomes damaged and must be resurfaced to prevent excessive entry of water into the ship. Our application describes apparatus and methods of resurfacing the sleeve. This application is, however, directed toward the resurfacing of the main shaft 1 itself.

The device, as illustrated, has in effect complementary upper and lower assemblies which, in assembling, are first individually assembled and then the lower assembly is mounted on the shaft so that the filler rings ride on the outer undamaged portions of the shaft. The upper assembly is then placed over the shaft and attached to the lower assembly. The clamp assembly is now bolted about and affixed to the shaft. Horseshoe shims may be employed in attaching the thrust bearing back plate where there is excessive distortion of the shaft. The air motor is mounted with its gear coupled to the bull gear and then the cylinder mountings tightened about the shaft.

The resurfacing machine is now ready to operate. The holder is positioned at one end of its travel by means of the star wheel. It has been found satisfactory to operate the assembly at a rotational speed of 18 r.p.m., since this is fast enough for most purposes and yet safe for precision operation. Although an electric motor can be substituted for the air motor, the air motor is used aboard ships for several reasons, namely, a supply of air pressure is readily available, and a better speed control can be achieved at a lower cost with fewer components. The air motor by way of coupled gears 16 and 17 rotates the encircling assembly and the holder is progressively moved along at a selected rate by rotation of the star wheel which, in turn, rotates the feed screw, thereby moving the holder and so grinding the shaft over any selected exposed surface. The star wheel may, if desired, be rotated automatically by placing one or more stationary trips (not shown) in its path of travel. These trips may be secured to the shaft which is stationary by a shaft bracket and their number would determine the number of revolutions of the feed-screw per revolution of the encircling assembly or in effect, the cross-feed rate. The entire boring bar assembly, including the star wheel, may be of any standard or well-known design and may include other features as are commonly employed by machinists.

The illustrated embodiment of this invention as can readily be observed is adaptable to a variety of situations and types of machining operations where precision resurfacing of the shafts or the like is required. Furthermore, since the cross-feed and rotational speeds are variable, different grinding devices are possible and the space necessary to conduct the resurfacing is held to a minimum. In addition, the entire operation may be carried out manually simply by replacing the motive means or the motor by a gear train which may be suitably rotated manually and proportioned to turn the assembly since only a slow speed is required and the assembly is provided with rotational bearings.

It will be understood that various changes in the details, materials and arrangement of parts which have been herein described and illustrated in order to explain the nature of this invention, may be made by those skilled in the art within the principle and scope of the invention as expressed in the appended claims.

We claim:
1. Apparatus for resurfacing a selected axially extending annular area of a shaft while said shaft is stationary, which comprises:
   a split cylindrical shell surrounding said shaft and having integral radial flanges at opposite ends thereof, one of said flanges being a thrust flange,
   arcuate bearing shoes in opposite end portions of said shell bearing directly on said shaft for rotatably supporting said shell on said shaft in accurately centered relationship to said shaft,
   stationary thrust bearing assembly means releasably engaging said thrust flange at one end of said shell to restrain said shell against displacement in either axial direction,
   said thrust bearing assembly means including:
      an annular shaft clamp member releasably affixed to said shaft having a laterally extending outer annular portion,
      said outer portion having inwardly opening radial recess for confining therein, against axial movement, an outer portion of said thrust flange at one end of said shell.

2. Apparatus for resurfacing a selected axially extending annular area of a shaft while said shaft is stationary, which comprises:

a split cylindrical shell surrounding said shaft and having integral radial flanges at opposite ends thereof, one of said flanges being a thrust flange, arcuate bearing shoes in opposite end portions of said shell bearing directly on said shaft for rotatably supporting said shell on said shaft in accurately centered relationship to said shaft, stationary thrust bearing assembly means releasably engaging said thrust flange at one end of said shell to restrain said shell against displacement in either axial direction, said thrust bearing assembly means including:

an annular shaft clamp member releasably affixed to said shaft having a laterally extending outer annular portion, said outer portion having inwardly opening radial recess for confining therein, against axial movement, an outer portion of said thrust flange at one end of said shell, an annular gear mounted on said flange at the other end of the shell, a fluid motor having a driving pinion, means mounting said motor stationarily on said shaft with said pinion in driving relation to said gear whereby said shell is rotated on said shaft by said motor, guide bar means mounted on said shell externally thereof and extending parallel to the axis of said shell between said flanges, a holder movable axially on said guide bar means between said flanges, means for restraining said holder from rotation on said guide bar means, means for progressively moving said holder axially of said guide bar means, a grinder having a rotatable abrasive operating end, carried by said holder in position to engage a portion of said shaft between said shoes, said shell having an opening inwardly of said tool holder to permit said operating end to engage said shaft as said shell is rotated on said shaft and, means for rotating said operating end carried by said holder, and means for moving said operating end radially inwardly to remove a selected amount of material from said shaft as said shell is rotated.

3. The apparatus according to claim 2, wherein said means for rotating said operating end is an electric motor carried by said holder and further including electrical means partially carried by said thrust flange for electrical connection to said motor whereby external connection of an electrical power source can be made to said motor while said shell is rotating.

4. The apparatus according to claim 3, wherein said electrical means includes:

a pair of concentric collector rings carried by said thrust flange, and a pair of stationary brushes in contact with said collector rings and carried by said clamp member.

References Cited by the Examiner

UNITED STATES PATENTS

| | | | |
|---|---|---|---|
| 1,902,188 | 3/33 | Schmidt et al. | 51—241.0 |
| 3,141,364 | 7/64 | Kelley et al. | 83—4 |

LESTER M. SWINGLE, *Primary Examiner.*